United States Patent Office 2,712,432
Patented July 5, 1955

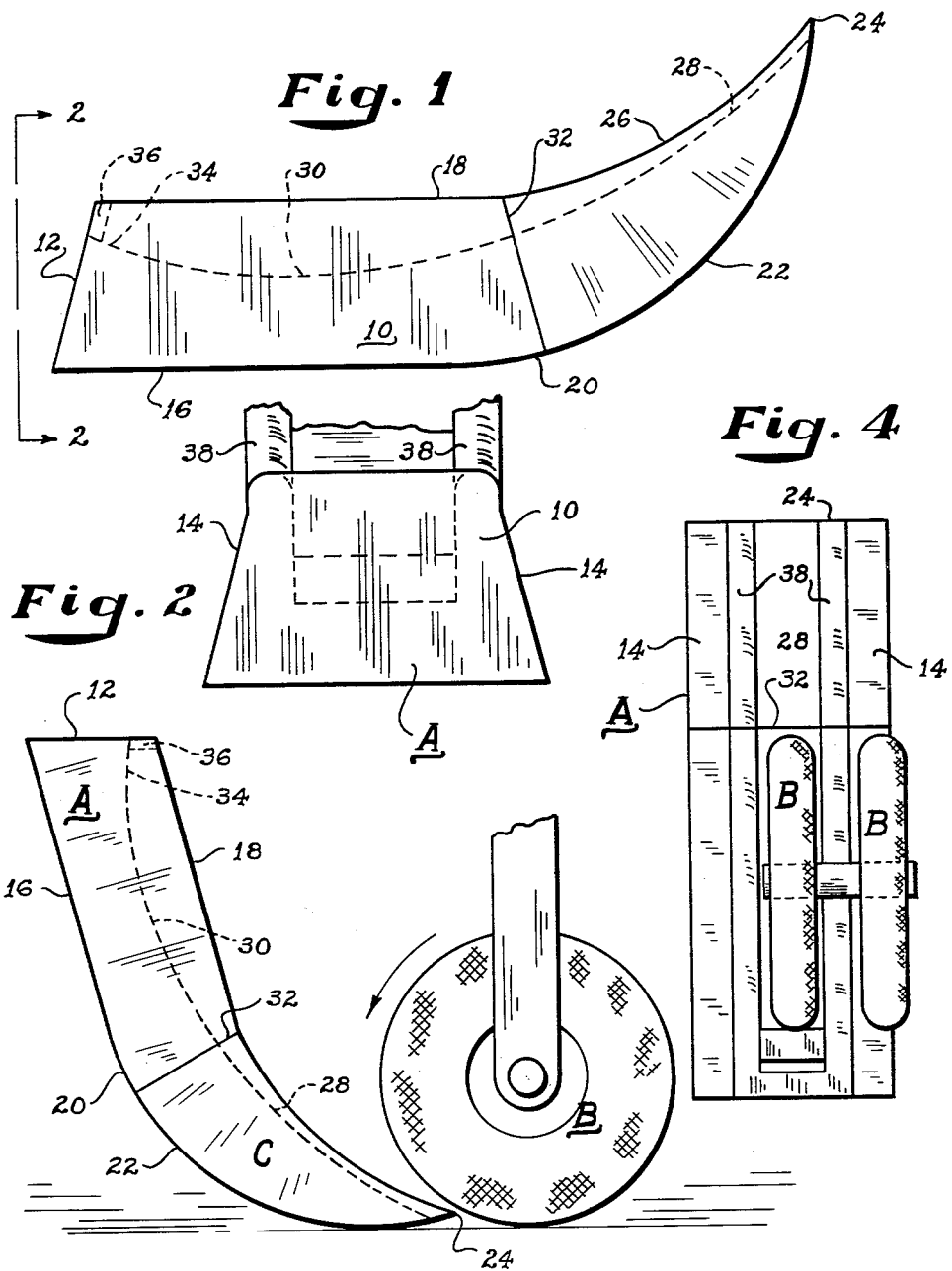

2,712,432

ROLL-ON-JACK

Phillip H. Thornton, Jr., Charleston, Miss.

Application December 8, 1953, Serial No. 396,925

3 Claims. (Cl. 254—88)

This invention relates to a motor vehicle supporting device, and is more particularly directed to a means for elevating and holding in elevated position, the two front wheels of a tractor in order to permit mechanical work to be performed thereon.

Many tractors used in agricultural work, as hereinafter referred to in more detail, include a pair of closely arranged small wheels at the forward or steering end. These are raised for mechanical work purposes, and lowered from such position, as a single unit because of their rigid mounting. The invention here detailed contemplates the raising of these two wheels by supporting one of them by the device of this invention, with the other wheel being outside of the supporting means so that it may be easily rotated or removed as indicated, free from the weight of the tractor, while leaving other of the front wheels of the vehicle in the elevated position.

An object of the invention, therefore, is to provide a supporting device for a motor vehicle wheel, especially of the tractor type which is characterized by a simplicity of construction, and by its ease of operation.

Another object is the provision of a wheel elevating device which may be made of a single part, and which assures steadiness and proper security of the vehicle during the raising and lowering operations thereof.

Another object is to provide a device of this type which increases the protection of the vehicle and its tires during repair operations thereon.

Still another object is the provision of a device of this character and by which the operator of the vehicle, without assistance, may cause a singly mounted wheel or dually mounted wheels thereof to be elevated to a position where repairs may be made.

Other objects will appear hereinafter throughout the specification.

In the drawings:

Figure 1 is an elevation of the device of this invention;

Figure 2 is a front elevation taken on the line 2—2 of Figure 1;

Figure 3 is a side elevational view showing a device in operation; and

Figure 4 is a top plan view of a pair of tractor wheels with one of them resting on the device following an elevation of the wheels.

The invention embodies a block which may be solid for purposes of rigidity and strength and which is composed of one, or two or more parts rigidly connected to each other, the parts being constructed of steel or other metallic material; although, in some instances, wood or other non-metallic material may be used in the construction of the device.

Many tractors used in agricultural work are constructed on the tricycle principle, i. e., there is a pair of spaced rear driving wheels of large diameter, and the forward steering end of the vehicle includes a pair of closely arranged smaller wheels. This forms a three-point suspension or supporting means for the vehicle, the two front wheels acting as a substantially single supporting point, and the rear wheels forming the other two supporting points.

There is no place on the front end of the tractor, with the exception of the tractor frame, against which a jack may be placed for the purpose of raising the front wheel support of the vehicle. Consequently, the usual method used to raise the front end of the tractor of this type is to make a raised platform from a block of material having an inclined rear top surface in part, the remainder of the top surface being substantially horizontal. One front wheel of the tractor is driven up the inclined roadway and onto the horizontal portion thereof, with the other wheel being left unsupported off the edge of the roadway enabling it to be easily rotated or removed as indicated. Since the front wheels of such tractor are not visible to the driver, because such wheels are hidden from him by the motor and other parts of the vehicle, the driving of the tractor onto the block requires not only the services of the tractor driver, but also of another person who must direct this operation, so that one front wheel rests on the block with the other being left unsupported off the edge thereof and so that the supported wheel will not run off the block.

The weight of the tractor is such that the runway must be of considerable strength. This problem is further complicated by the fact that sometimes a cultivator weighing one thousand pounds or more is mounted on the front end of the tractor.

Other difficulties include the prevention of running the tractor completely off the block when driving the tractor wheel thereon, due to the burst of power which is necessary to cause the tractor wheels to move up the incline of the runway. Moreover, it is also difficult to keep only one wheel firmly seated on the runway and block and at the same time to keep the other wheel completely unsupported off the edge of the runway and block so that it may be easily rotated or removed.

An additional difficulty is that with such a runway there is a pronounced tendency to skid or slide the block along its supporting surface as it is attempted to drive the front wheel of the tractor up the inclined portion of the block. This difficulty is aggravated by the fact that such elevating blocks frequently are located on garage floors which are slippery with oil from the crank cases of other vehicles. The weight of the tractor, and on occasion the additional weight of the cultivator, often requires great difficulty in the movement of the front wheels up the inclined portions of the runway.

The present invention completely overcomes these difficulties due to the fact that it operates on a rocker principle. As the car is driven onto the device of this invention, the said device is caused to rock, thus preventing skidding of the device and insuring proper alignment of the wheel as the vehicle is driven onto the device.

Referring to the drawings, the letter A indicates the supporting device hereinafter referred to as the roll-on-jack as a whole. This may be a solid integral block of material, or it may be of sheet metal or cast metal of suitable thickness. The front wheels of the tractor are diagrammatically indicated at B.

The roll-on-jack shown at A is provided with a body 10 having a front portion 12, inclined sides 14, a horizontal base 16, and a top 18.

Attached rigidly to said base, or forming a part of the same casting or piece of sheet metal, is a rocker element C. The rear surface of the base 16 is slightly curved as shown at 20, and this curved surface forms a continuation of the curved undersurface or base 22 of the rocker element as shown in Figures 1 and 3.

This base 22 is on a gradually upwardly moving curve which terminates front end or entrance 24 on a line which corresponds to the upper curved surface 26 of said rocker member. It will be noted that the curved surface 22 is a compound curve of continuously decreasing radii from the point where the rocker element is joined to the body 10, to the rear end 24 which latter forms an edge, which edge is to be first engaged by the wheel of the tractor.

The roll-on-jack is provided with a track, the front portion 28 of the track and which forms part of the upper surface of rocker element C, substantially merges with the front end or edge 24, and this surface is also on a curve of diminishing radii from the front or entrance to rear of the rocker element. The decrease in radii of the track 28 is less than the decrease in radii of that of the curved undersurface of the rocker element C.

The track 30 of the base 10 is considerably deeper than the track 28, and these tracks merge together on the line 32 or at the juncture of the body 10 with the rocker element C.

It will be noted that the portion of the track adjacent the front portion 12 of the body is inclined upwardly as shown at 34, in order to produce a retarding effect in the rotation of the vehicle front wheel B. Moreover, an upwardly projecting wall 36 may be provided that will act as a positive stop for the said wheel B.

The wheel which is to enter the runway and rest upon the roll-on-jack will be referred to hereinafter as the supported wheel. The wheel on which work is to be done and which will not rest on the roll-on-jack will be referred to hereinafter as the unsupported wheel.

Assuming it is desired to raise the wheels of the tractor off the ground, the roll-on-jack is placed in the position shown in Figure 3 with the rear end or edge 24 in engagement with the underside of the tire on the supported wheel of the vehicle. The vehicle is then caused to moved forwardly with the supported wheel B rotating in a counterclockwise direction as shown in Figure 3. This will cause the wheels to be elevated as the supported wheel engages the track portions 28, 30, and 34 of the roll-on-jack. As this wheel rolls along the track, the undersurfaces 22, 20, and 16 of the jack are caused to rollingly engage the supporting surface of floor on which the jack is supported. The vehicle finally comes to rest with the supported wheel engaging the track low portion 30 and the rear wall 36 due to the fact that as the tractor moves forward, the jack rocks backward until it rests firmly on the flattened or horizontal base portion 16.

With the construction shown and as described above, there is no steep incline for the wheel to climb, and there is a less decided drop as the wheel of the tractor rolls into the final position on the jack. This is due to the fact that the arc of the track is less than the arc from the curved undersurface 22 of the base. It is also due to the fact that the arced portions 30 and 34 lie above the flat or horizontal base 16.

The high clearance behind the front wheels of a tricycle-type tractor makes impossible the use of conventional automobile jacks, but it provides ample clearance for the curved runway of the roll-on-jack. Because of the different arcs of curvature between the track and the surface of the base, there is no tendency for the jack to skid as the vehicle is propelled thereon.

The raised portions on either side of the track provide flanges 38 which cause the supported wheel to properly seat itself, even though the jack is not placed directly in line with the movement of the tractor, with the unsupported wheel elevated but out of contact with the jack.

It will be understood that the invention may be used with other types of vehicles than tractors, even though it is particularly adapted for this type of vehicle. Hence the term "tractor" in the specification and claims designates any type of vehicle.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A roll-on-jack for tractors having a body portion, said body portion being provided with a forward rocker portion having a substantially pointed end for engagement by a forwardly moving wheel of a tractor, said body portion having a substantially flat under-surface and said forward rocker portion having an under-surface which is curved in longitudinal cross section, said jack having a track, an upwardly projecting transverse wall at the rear end of said track, said track extending forwardly to adjacent said pointed end, longitudinally extending spaced flanges forming the side walls of said track, at least one of said flanges being of a width less than the distance between a pair of front wheels of a tractor whereby when one of said pair of wheels runs onto said track to the point where it is engaged and stopped by said upwardly projecting wall, the other of said pair of wheels remains freely suspended in elevated position by reason of the engagement of said one wheel with said track with one of said flanges extending between said pair of wheels, said track having a portion of substantial depth above the flat under-surface of said body portion as defined by said flanges, said track having an upwardly inclined surface extending from said portion of substantial depth to said upwardly projecting back wall, said jack being freely supported on a horizontal surface of a floor or road surface to thereby rock on said surfaces as the front wheel of a tractor rolls on said track from the pointed end of said jack to said upwardly projecting wall.

2. The structure of claim 1 in which the side walls of said body portion and forward rocker portion are inclined downwardly and outwardly from said flanges to the flat and curved under-surfaces of said body and rocker portions, respectively.

3. The structure of claim 1 in which the track of said rocker portion is of less depth than that of said body portion.

References Cited in the file of this patent
UNITED STATES PATENTS
1,947,346    Lintern _____ Feb. 13, 1934